Feb. 19, 1957    H. E. MARTIN    2,782,039
EDUCATIONAL GAME
Filed Jan. 12, 1953
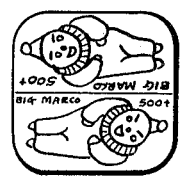
FIG. 1.
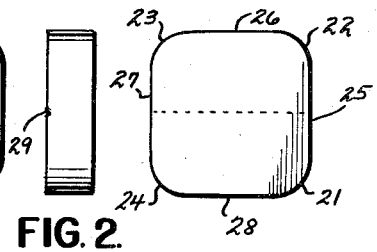
FIG. 3.
FIG. 2.
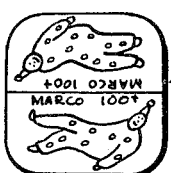
FIG. 4.
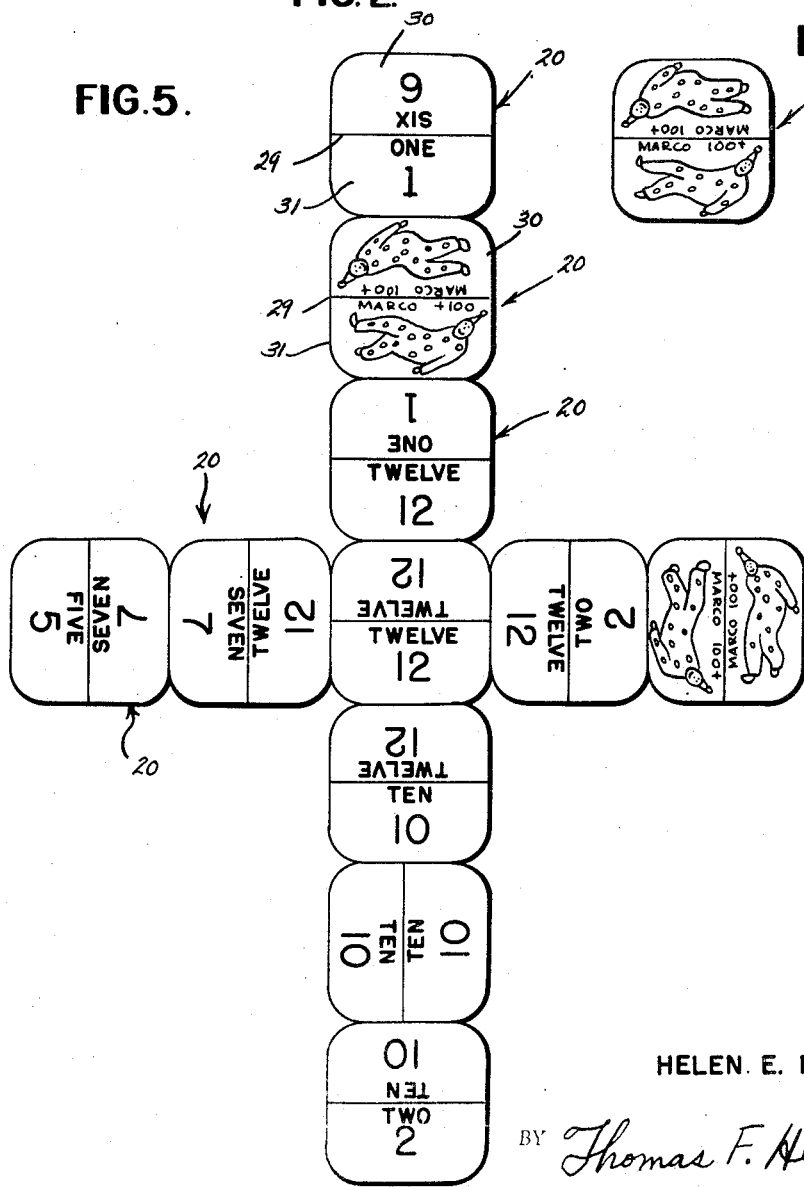
FIG. 5.
INVENTOR
HELEN. E. MARTIN
BY Thomas F. Healy
ATTORNEY

United States Patent Office 2,782,039
Patented Feb. 19, 1957

2,782,039

EDUCATIONAL GAME

Helen E. Martin, San Antonio, Tex.

Application January 12, 1953, Serial No. 330,724

1 Claim. (Cl. 273—137)

The present invention relates to a game, and more particularly to a game played with a plurality of game pieces or chips.

One of the objects of the present invention is to provide an educational game for children and adults which is played with a plurality of chips, with each of said chips being given a numerical value, so that the game in play is not only interesting but develops the mathematical sense of the players.

Another object of the present invention is to provide a set of game pieces comprising a plurality of identically shaped chips, each of said chips being generally square in shape and having four gently rounded corners, each of said chips having a centrally disposed dividing line only on one face thereof, some of said chips each having two mathematical symbols only on one face thereof with one of said symbols being disposed on one side of said dividing line thereon and the other of said mathematical symbols being disposed on the other side of said dividing line thereon, each of said mathematical symbols having the English word associated therewith indicating the numerical value of said mathematical symbol, some of said chips having a pictorial representation thereon together with a mathematical symbol denoting the numerical value of said chips in play, and each of said plurality of chips being of such a thickness to permit said chip to stand upright on any one of the four side edges thereof.

Still another object of the present invention is to provide a set of game pieces comprising a plurality of identically shaped chips, each of said chips being generally square in shape and having four gently rounded corners, each of said chips being transversely scored on only one face thereof, some of said chips having two different mathematical symbols only on one face thereof with one of said symbols being disposed on one side of said scored line thereon and the other of said mathematical symbols being disposed on the other side of said scored line thereon, each of said mathematical symbols having the English word associated therewith indicating the numerical value of said mathematical symbol, some of said chips having the same mathematical symbol on either side of said scored line together with the English word indicating the numerical value thereof, some of said chips having the same pictorial representation thereon together with a mathematical symbol denoting the numerical value of said chips in play, one of said chips having a different pictorial representation thereon together with a mathematical symbol denoting the greater numerical value of said chip in play, and each of said plurality of chips being of such a thickness to permit said chip to stand upright on any one of the four side edges thereof.

Yet another object of the present invention is to provide a set of game pieces comprising a plurality of identically shaped chips, each of said chips being generally square in shape and having four gently rounded corners, each of said chips having a centrally disposed dividing line only on one face thereof, each of said chips having a symbol on either side of said dividing line indicating the numerical value of said chip in play, and each of said chips being of such a thickness to permit said chip to stand upright on any one of the four side edges thereof.

Other and further objects and advantages of the present invention will be apparent from the following description thereof and from the claim appended thereto.

In the drawing wherein like numerals refer to like or corresponding parts throughout the several views:

Figure 1 is a top plan view of one of the plurality of game pieces employed in playing the game of the present invention, and indicating "Big Marco" having a numerical value of five hundred plus (500+) in play;

Figure 2 is a side elevation of the playing chip shown in Figure 1;

Figure 3 is the reverse side of the playing chip shown in Figure 1;

Figure 4 is a top plan view of a bonus chip, of which there are eight, having the same pictorial representation and having a numerical value in play of one hundred plus (100+); and Figure 5 is a plan view showing a plurality of the chips being disposed in their assumed positions as the game is played.

Referring now to the drawing, the invention generally comprises a game played with a plurality of chips or game pieces. The game may be played with either one hundred playing pieces, or smaller sets containing seventy-two game pieces or thirty-two game pieces.

Referring to Figure 5 of the drawing, there is shown a plurality of chips, which has been generally indicated by the numeral 20. The playing chips 20 are preferably square in shape with four gently rounded corners which have been indicated by the numerals 21, 22, 23 and 24. Each of the playing chips 20 is identical in size and shape and also includes the four sides 25, 26, 27 and 28. As shown in Figure 2, each chip 20 is transversely scored at 29 to divide each chip into two portions 30 and 31.

The numbers on Marco chips range from zero to twelve. There is one double of each number. A double means a chip with the same number on each side of the dividing line. There are nine bonus chips, each bearing the picture of a clown on each side of the dividing line, and the name "Marco" and the value of the chip. Eight of them are alike and are valued at one hundred plus (100+) whatever score happens to be up at the time the "Marco" bonus chip is played. The ninth bonus chip is "Big Marco" and is valued at five hundred plus (500+) the score that is on the board at the time he is played. The clowns on "Big Marco" are fat and dressed differently from the others. The remaining seventy-eight pieces are numbered and lettered differently on each side of the dividing line, the numbers varying from zero through twelve. The chips are blank on the back side so far as numbers, etc. are concerned, but may bear some type of decoration if a manufacturer so desires.

There is almost no limit as to how many persons may play this game at one table. Twelve may play at one time and still have plenty of stock; yet as few as two players may have just as much fun.

Start the game by turning all the chips face down on a table and shuffle by moving them round and round with the hands. If two players or any uneven number as three, five, or seven play, the game is "cut throat" or every man for himself and against the others. If there are four players or any other even number, they may play "partners" with one side against the other.

Referring now to Figure 5 of the drawing, it will be assumed that there are four players playing the game of Marco in order to illustrate how the game is played. The players will be respectively indicated as North, East, South and West.

First, the one hundred chips are thoroughly shuffled and placed on a convenient part of the playing board, and each player is permitted to select 10 playing pieces or chips in order to start the game. After each player has his ten playing pieces, it is ascertained which player has the "Double-Twelve." For purposes of illustration, it will be assumed that North has the "Double-Twelve." If so, he plays the "Double-Twelve" in the middle of the playing surface. In the event no one has the "Double-Twelve," and it still remains in the pile in the center of the playing surface, anyone who has the "Double-Eleven" may open play. If no one has the "Double-Eleven" then the "Double-Ten" may open play. In other words, it is necessary to have a double chip in order to open the game and start play.

In the illustration of Figure 5, North and the "Double-Twelve" and opens the play. It is now East's turn to play, and in order to make a play it is necessary that East have in his hand at least one chip with the number twelve thereon. One cannot play a bonus chip or "Big Marco" on the double number in the center of the board.

Assuming that East does not have a chip in his hand with the number twelve thereon, in order to make a play on the "Double-Twelve," he must draw from the plurality of chips on the table, taking one chip after the other until such time as he selects a chip having the number twelve thereon. Once East has selected a chip from the pile on the table with the number twelve thereon, he can play the same against the "Double-Twelve" in the middle of the board. As shown in Figure 5, East plays the "Twelve-One" chip. By playing this chip "Twelve-One" on the "Double-Twelve," East is entitled to receive twenty-five points, or the total of the two twelves plus one. East has a scoreable count, as 25 is divisible by five.

It is now South's turn to play, and South may play on any one of the four places of play, having in mind that no player can play either "Big Marco" or a bonus chip on the "Double-Twelve" in the center of the table. Assuming that South has a bonus chip, he may elect to play the same as indicated on the "Twelve-One" chip that East played on the "Twelve-Twelve" chip. South may make this election because in order for a bonus chip to be played and count heavily it is necessary that the total of the chips upon which the bonus chip is played be divisible by five. In other words, in playing the bonus chip on the chip that East played, South would be entitled to one hundred twenty-five points, or the bonus of one hundred plus the total of twenty-five, a number divisible by five.

It is now West's turn to play, and West has a chip "Twelve-Two" which West plays on the "Double-Twelve." In making the play of the "Twelve-Two" chip on the "Double-Twelve" West receives no points.

North, having no chips in his hand with the number twelve thereon decides to play the "One-Six" chip. This play entitles North to no points as thirty-two is not a scoreable count.

If a player scores thirty-five points and the next player plays a "Marco," he scores one hundred thirty-five. If the next player also plays a "Marco," he scores two hundred thirty-five. If "Big Marco" is played by the next player, he would score seven hundred thirty-five. The game proceeds by matching the numbers on the open ends of the chips played. After a "Marco" is played, the succeeding chip must match the one played before the "Marco." The "Marco" continues to count one hundred or five hundred for "Big Marco," until he is "covered" or played on with a chip matching the one preceding the "Marco." The chip preceding the "Marco" will count until "Marco" is "covered."

A "Marco" cannot be played on a "Marco," but there can be as many as four "Marcos" up at one time, as the pattern goes in four directions. A "Marco" cannot be played on the first double or "spinner." It must sprout at least one chip between the spinner and the "Marco." Once the "Marco" is "covered," he ceases to count and only the open end figure is added in figuring the total count and whether said count is scoreable. In Marco the score can go from a very high figure to a very low one in one play, according to the strategy used, or from a very low figure to a very high figure.

If a player does not have a matching chip in his hand he must go to the stockpile or stockyard and draw one at a time until he draws a matching chip or "Marco." The stockpile consists of the chips that are left face down on the table after the first chips are drawn. Players may have to go to the stockpile several times during a hand.

If a player chooses to waste a "Marco" by playing him when there is no "count" up, rather than go to the stockpile and try to draw a matching chip, he may do so, but this is rarely done unless it is late in the hand and the player fears being caught with him still in his hand. Players usually try to hold "Marco" until he can be scored with, and dig in the stockpile for a matching chip.

Always try to play "Marco" where he counts the most, but also try not to get caught with him still in the hand when another player goes "out," for he is deductible from the score of the player who is caught with him at the end of a hand, at the same value he adds to the score when played. "Marco" can win the game for you, or sink you in the hole. It's all according to how you play him.

When one player plays his last chip, he calls "Marco," or "out," and all the other players must each add the points on all the chips they are caught with. The score is added and the penalty points that the other players are caught with is then subtracted from their score, using the nearest figure divisible by five. For instance, if caught with 22 points, subtract 20. If caught with 23 points, then subtract 25.

Bonuses or penalties may be introduced in playing Marco. A bonus of one hundred may be given to the player going out first. A penalty of one hundred is scored against a player if he overlooks a scoreable count.

The player or side having 2500 points or more wins the game. Some players prefer 5000 for the game, and if so it should be so designated before the start of play, but no Marco game should be less than 2500.

Referring to Figure 5 of the drawing, various plays may be made on the "Double-Twelve" by the various players to obtain different counts, depending upon how the plays are made. For example, if "Double-Twelve" has been played by North, North would not score any points as "Double-Twelve" totals twenty-four, and since twenty-four is not divisible by five, North cannot score.

If East plays "Twelve-One" on the "Double-Twelve," East can score twenty-five points, as the total of the "Twelve-Twelve" chip and the "Twelve-One" chip is twenty-five, a figure divisible by five.

If South plays a "Marco," South can score one hundred twenty-five points, or the total of twenty-five plus one hundred for the "Marco."

If West then plays a "Twelve-Ten" chip, West can score one hundred thirty-five points, or a total of twelve plus twelve, plus ten, plus one, plus one hundred for the "Marco."

If North plays a "Ten-Ten" chip on the "Twelve-Ten" chip, North can score one hundred forty-five points on his second play, which score includes the one hundred for the "Marco."

If East plays the "Twelve-Seven" chip on the "Double-Twelve" chip, as indicated in Figure 5 of the drawing, East can score one hundred forty points on his second play.

If South plays the "Ten-Two" chip on the "Double-Ten," South can score no points, as the total count is one hundred twenty-two, which is not divisible by five.

If, on his second play, West plays the "Twelve-Two" chip on the "Double-Twelve," West can score no points, as the total is one hundred twelve, a figure not divisible by five.

If North, on his third play, plays the "Seven-Five" chip on the "Twelve-Seven" chip, North can score one hundred ten points, as the total equals one hundred ten, which is divisible by five. This total of one hundred ten is arrived at by taking the "Marco" chip as one hundred, plus the total of the outside figures of the "Twelve-One" chip, the "Twelve-Two" chip, the "Ten-Two" chip, and the "Seven-Five" chip. As can be seen from Figure 5, these figures are one, two, two, and five, which added to one hundred for the "Marco" chip, gives a total of one hundred ten, or a scoreable count, as one hundred ten is divisible by five.

East on his third play, can score two hundred ten points if East plays a "Marco" on the "Twelve-Two" chip, as shown in Figure 5 of the drawing. The figure of two hundred ten is obtained by assigning the value of one hundred to each of the two "Marco" chips, and totaling this two hundred together with the outside numeral of each one of the last played chips, not including the "Marco" chip. As is indicated in Figure 5 of the drawing, these numerals would be one, from the "Twelve-One" chip, two, from the "Twelve-Two" chip, two from the "Ten-Two" chip, and five from the "Seven-Five" chip, giving a grand total of two hundred ten, a number divisible by five.

South, on his third play, may score one hundred fifteen points, by placing the "One-Six" chip on the "Marco." In covering the "Marco" with the "One-Six" chip, said "Marco" is killed, and does not count anymore in the hand. However, there is still one "Marco" chip which does count, and when one totals the one hundred points for said "Marco" together with the ouside figure of each of the last played chips, the total is one hundred fifteen, a figure divisible by five, so that South has a scoreable count of one hundred fifteen on his third play.

Various players can obtain different counts depending upon the particular chips they have available for play. As another example of the way the chips shown in Figure 5 may be played, assume that North opens the play with a "Double-Twelve." North cannot score on the "Double-Twelve" play, as twenty-four is not divisible by five.

East now plays the "Twelve-One" chip on the "Double-Twelve" and scores twenty-five, or a total of twenty-four from the "Double-Twelve" chip and one from the "Twelve-One" chip.

South plays the "Marco" on the "Twelve-One" chip and scores one hundred twenty-five points on his first play, or a total of twenty-four from the "Double-Twelve" chip, one from the "Twelve-One" chip, and one hundred for the "Marco."

West plays a "Twelve-Two" chip on the "Double-Twelve" chip but cannot score as the total count is one hundred twenty-seven, which is not divisible by five.

North then plays the "One-Six" on the "Marco" to nullify the "Marco" chip in the scoring play, and as the total count is thirty-two, a figure not divisible by five, North cannot score. However, North prevents one of his opponents from utilizing the "Marco" for scoring at a later play. It is sometimes the best strategy to nulllify a "Marco" for future scoring, if you cannot score him yourself.

East plays the "Twelve-Seven" chip on the "Double-Twelve" chip but cannot score as the total count of the chips is twenty-seven, a number not divisible by five. In arriving at the total count of twenty-seven, one adds the outside number from each of the uncovered chips played, to wit, the six from the "Six-One" chip, the seven from the "Twelve-Seven" chip, the twelve from the "Double-Twelve" chip, and the two from the "Twelve-Two" chip, to give a total of twenty-seven.

South then plays the "Seven-Five" chip on the "Twelve-Seven" chip and scores twenty-five, as the total of the outer numerals on each of the exposed chips adds up to twenty-five, a number divisible by five.

West then plays the "Marco" on the "Twelve-Two" chip and scores one hundred twenty-five points, a number divisible by five. In arriving at the total of one hundred twenty-five points, the "Marco" has a value of one hundred, the adjoining "Twelve-Two" chip a value of two, the "Double-Twelve" chip, a value of twelve, the "Seven-Five" chip a value of five, and the "One-Six" chip a value of six, or a grand total of one hundred twenty-five points.

North plays the "Twelve-Ten" chip on the "Double-Twelve" and cannot score any points as the total count is one hundred twenty-three, a figure not divisible by five.

East plays the "Ten-Ten" chip on the "Twelve-Ten" chip and cannot score any points on his third play as the total is one hundred thirty-three. In arriving at the total of one hundred thirty-three, the "Marco" has a value of one hundred, the adjoining "Twelve-Two" chip a value of two, the "Double-Ten" chip a value of twenty, as both sides are exposed, the "Seven-Five" chip a value of five, and the "Six-One" chip a value of six, or a grand total of one hundred thirty-three.

South then plays the "Ten-Two" chip on the "Double-Ten" and scores one hundred fifteen points on his third play. In arriving at the total of one hundred fifteen, the "Marco" has a value of one hundred, the adjoining "Twelve-Two" chip a value of two, the "Ten-Two" chip a value of two, the "Seven-Five" chip a value of five, and the "One-Six" chip a value of six. It is to be noted that only the first double played, to wit, "Ten-Ten," counts crosswise, and this "Double-Ten" no longer counts twenty as it has been covered by the "Ten-Two" chip, which was played by South.

It is now West's turn to play, and he has the possibility of scoring six hundred fifteen points if he has the "Big Marco," or two hundred fifteen points if he has a "Marco" which he may play on the "One-Six" chip, the "Seven-Five" chip, or the "Ten-Two" chip.

And so the game is continued until it is completed.

The numbered chips may also be used for other games. Any game that can be played with dominoes may also be played with the numbered chips of the Marco game.

The game can be played with any number of players. After the chips are shuffled, when there are up to six players, each player draws ten chips. If there are seven, eight, or nine players, each player draws eight chips. If there are ten or more players, each player draws six chips. The chips may be stood on edge in front of the player so that the opponents cannot see the value of the chips, although the value thereof will be readily discernible to the owner of the chips.

The playing chips may be made of any suitable hard material, such as wood, plastic, rubber, metal or the like. They should be made from stock which is sufficiently thick, say one-fourth of an inch, so as to be able to stand upright on edge and readily visible to the player owning said chips, but not to opposing players.

The chips are generally square in shape with gently rounded corners to permit an easy shuffling operation to thoroughly mix the chips face down on the table in edgewise contact with each other without turning them wrong face up to visible to the players. As illustrated in the drawings, each rounded corner follows an arc having a substantial radius.

Various modifications of the present invention will be apparent to those skilled in the art without departing from the spirit thereof, and it is therefore desired to be limited only by the scope of the appended claim.

What is claimed is:

A set of pieces for an educational game for developing the mathematical sense, said pieces being identically shaped and made of a hard material, each piece consisting of a chip of generally square shape with gently rounded corners, thereby having four flat sides, each of said chips having a marked face and a blank back, the marking on some of said chips comprising two numbers one of which is disposed on one side portion of said face and the other on the other side portion of said face, each number having associated therewith the word corresponding thereto, the marking on some of said chips comprising a pictorial representation and a number denoting the numerical value thereof, each rounded corner following an arc having a substantial radius, the shape of each chip thereby being such that the set of chips may be readily shuffled face down on a table or board in edgewise contact with each other without turning any chips wrong side up, and each chip being of such thickness as to permit it to stand upright on any one of its four flat sides.

References Cited in the file of this patent

UNITED STATES PATENTS

| | | |
|---|---|---|
| 377,832 | Kimball | Feb. 14, 1888 |
| 681,925 | O'Neill | Sept. 3, 1901 |
| 1,666,448 | Hardenstein | Apr. 17, 1928 |

FOREIGN PATENTS

| | | |
|---|---|---|
| 9,994 | Great Britain | 1897 |
| 634,547 | Great Britain | Mar. 22, 1950 |